US012230974B2

(12) United States Patent
Arnold

(10) Patent No.: US 12,230,974 B2
(45) Date of Patent: Feb. 18, 2025

(54) WIRELESS RECHARGEABLE BATTERY SYSTEMS AND METHODS

(71) Applicant: University of Florida Research Foundation, Inc., Gainesville, FL (US)

(72) Inventor: David P. Arnold, Gainesville, FL (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 610 days.

(21) Appl. No.: 17/613,982

(22) PCT Filed: Feb. 24, 2020

(86) PCT No.: PCT/US2020/019463
§ 371 (c)(1),
(2) Date: Nov. 24, 2021

(87) PCT Pub. No.: WO2020/242547
PCT Pub. Date: Dec. 3, 2020

(65) Prior Publication Data
US 2022/0224160 A1 Jul. 14, 2022

Related U.S. Application Data

(60) Provisional application No. 62/854,467, filed on May 30, 2019.

(51) Int. Cl.
*H02J 50/12* (2016.01)
*H02J 7/00* (2006.01)
(Continued)

(52) U.S. Cl.
CPC ............ *H02J 50/12* (2016.02); *H02J 7/0044* (2013.01); *H02J 7/0048* (2020.01); *H02J 50/40* (2016.02); *H02J 50/80* (2016.02)

(58) Field of Classification Search
CPC ....................................................... H02J 50/12
(Continued)

(56) References Cited

U.S. PATENT DOCUMENTS 5,945,762 A  8/1999  Chen et al.
6,204,634 B1  3/2001  Zimmerman et al.
(Continued)

OTHER PUBLICATIONS

International Search Report and Written Opinion for International Application No. PCT/US20/19463 mailed Jun. 5, 2020.

*Primary Examiner* — Jerry D Robbins
(74) *Attorney, Agent, or Firm* — Thomas | Horstemeyer, LLP

(57) ABSTRACT

Embodiments of the present disclosure provide systems and methods for wirelessly charging household batteries without having to remove the batteries from battery-powered user-devices, consumer electronics, or other applications to which the batteries are being deployed. In one embodiment, a wireless rechargeable battery system comprises an electrical energy storage element for a wireless rechargeable battery; a wireless receiver for the wireless rechargeable battery, wherein the wireless receiver is configured to supply electrical energy to the electrical energy storage element in a presence of a magnetic field from a charging base station; and an internal electronics circuitry for the wireless rechargeable battery, wherein the internal electronics circuitry couples the electrical energy storage element and the wireless receiver.

21 Claims, 6 Drawing Sheets

(51) Int. Cl.
 H02J 50/40 (2016.01)
 H02J 50/80 (2016.01)
(58) Field of Classification Search
 USPC .......................................................... 320/108
 See application file for complete search history.

(56) References Cited

U.S. PATENT DOCUMENTS

| | | | | |
|---|---|---|---|---|
| 6,288,519 B1* | 9/2001 | Peele | ........................ | H02J 7/32 320/107 |
| 2006/0076922 A1* | 4/2006 | Cheng | .................... | H02J 50/12 320/108 |
| 2006/0108974 A1* | 5/2006 | Castillo | .................. | H02J 50/10 320/107 |
| 2009/0248333 A1* | 10/2009 | Grosberg | ............. | H01M 10/48 702/63 |
| 2011/0127955 A1 | 6/2011 | Chen et al. | | |
| 2011/0188677 A1* | 8/2011 | Rothkopf | ............. | H02J 50/005 320/108 |
| 2011/0210697 A1* | 9/2011 | Yin | .................... | H01M 10/4257 320/108 |
| 2011/0304220 A1* | 12/2011 | Whitehead | ............. | H04B 5/263 307/104 |
| 2013/0342057 A1* | 12/2013 | Fried | ..................... | H02K 7/065 310/80 |
| 2014/0176060 A1* | 6/2014 | Vorperian | .............. | H04R 25/55 320/108 |
| 2014/0176067 A1* | 6/2014 | Suzuki | .................. | H01M 10/46 320/108 |
| 2015/0008751 A1* | 1/2015 | Widmer | .................. | H02J 50/12 307/104 |
| 2015/0270736 A1* | 9/2015 | MacWilliams | ......... | H02J 50/90 320/101 |
| 2015/0303722 A1 | 10/2015 | Li | | |
| 2016/0099614 A1 | 4/2016 | Leabman et al. | | |
| 2017/0214276 A1* | 7/2017 | Boys | ....................... | H01F 38/14 |
| 2018/0166946 A1* | 6/2018 | Walsh | .............. | H02K 7/09 |
| 2020/0144876 A1* | 5/2020 | Seltzer | ................. | H02K 7/1823 |
| 2021/0075261 A1* | 3/2021 | Chen | .................... | H02J 7/0047 |

* cited by examiner

WIRELESS RECHARGEABLE BATTERY SYSTEMS AND METHODS

CROSS-REFERENCE TO RELATED APPLICATIONS

This application is the 35 U.S.C. § 371 national stage application of International Application No. PCT/US2020/019463, filed Feb. 24, 2020, which claims the benefit of and priority to U.S. Provisional Application Ser. No. 62/854,467, having the title "WIRELESS RECHARGEABLE BATTERY SYSTEMS AND METHODS," filed on May 30, 2019, the disclosure of which is incorporated herein by reference in its entirety.

TECHNICAL FIELD

The present disclosure is generally related to wireless power transmissions.

BACKGROUND

Wireless power transmission has great promise for seamlessly and conveniently recharging battery-operated devices without having to plug in a charging cable. While there has been much interest for charging consumer electronics (e.g., game controllers, tablets, etc.), these wireless charging systems require adoption and co-design/integration by tier-one device manufacturers. Additionally, there are enumerable other devices that are designed to be powered by conventional household batteries (AAA, AA, C, D, 9V, etc.) which are not capable of being wirelessly recharged by today's charging systems. These batteries represent a $4 billion market that is being neglected by today's wireless charging systems.

SUMMARY

Aspects of the present disclosure are related to a wireless rechargeable battery system. In one aspect, among others, a wireless rechargeable battery system comprises an electrical energy storage element for a wireless rechargeable battery; a wireless receiver for the wireless rechargeable battery, wherein the wireless receiver is configured to supply electrical energy to the electrical energy storage element in a presence of a magnetic field from a charging base station; and an internal electronics circuitry for the wireless rechargeable battery, wherein the internal electronics circuitry couples the electrical energy storage element and the wireless receiver.

In various aspects, the internal electronics circuitry can determine and display a status parameter for the wireless rechargeable battery. The internal electronics circuitry can comprise an LED indicator for showing a current state of charge for the wireless rechargeable battery. The wireless receiver can supply the electrical energy via electromechanical transduction.

In one or more aspects, the wireless rechargeable battery system can comprise the charging base station. The charging base station can comprise at least one coil. The charging base station can comprise a mechanically moving magnet. The wireless receiver can shape the magnetic field from the charging base station. The charging base station can comprise a flat charging pad. The charging base station can comprise a tower charging station. The charging base station can be integrated into a household product. In one or more aspects, a maximum charging distance between the wireless receiver and the charging base station is 3 feet. The charging base station can comprise a transmitter for generating a time-varying magnetic field at a frequency, wherein the frequency is within a range of 1-100 Hz, 10-1000 Hz, or 100-10,000 Hz.

In various aspects, the wireless rechargeable battery can comprise a cylindrical form-factor. The cylindrical form-factor can be for an AA or an AAA battery. In various aspects, the wireless rechargeable battery can comprise a rectangular prism form-factor. The electrical energy storage element can comprise a lithium ion battery cell, a nickel metal hydride battery cell, or a supercapacitor.

In one or more aspects, the wireless receiver can comprise a magnet supported by a suspension, a receiver coil, and internal circuitry, wherein the magnetic field induces the magnet to oscillate and generate an AC voltage in the receiver coil, wherein the internal circuitry converts the AC voltage to a DC charging signal that is applied to the electrical energy storage element. The internal electronics circuitry can comprise a sensor that is configured to detect a mechanical, acoustic, optical, or chemical condition and in response affect charging operation of the wireless rechargeable battery system. The internal electronics circuitry can be configured to actuate a magnet of the wireless receiver thereby producing a magnetic signal for communicating with the charging base station and/or a nearby wireless receiver of a nearby rechargeable battery system.

In another aspect, the wireless rechargeable battery system can comprise a battery casing that holds the electrical energy storage element, the wireless receiver, and the internal electronics circuitry. Structures of the battery casing, the electrical energy storage element, and/or the internal electronics circuitry can possess ferromagnetic materials.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims. In addition, all optional and preferred features and modifications of the described embodiments are usable in all aspects of the disclosure taught herein. Furthermore, the individual features of the dependent claims, as well as all optional and preferred features and modifications of the described embodiments are combinable and interchangeable with one another.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Embodiments of the present disclosure provide systems and methods for wirelessly charging household batteries without having to remove the batteries from battery-powered user-devices, consumer electronics, or other applications to which the batteries are being deployed.

Figure 1:
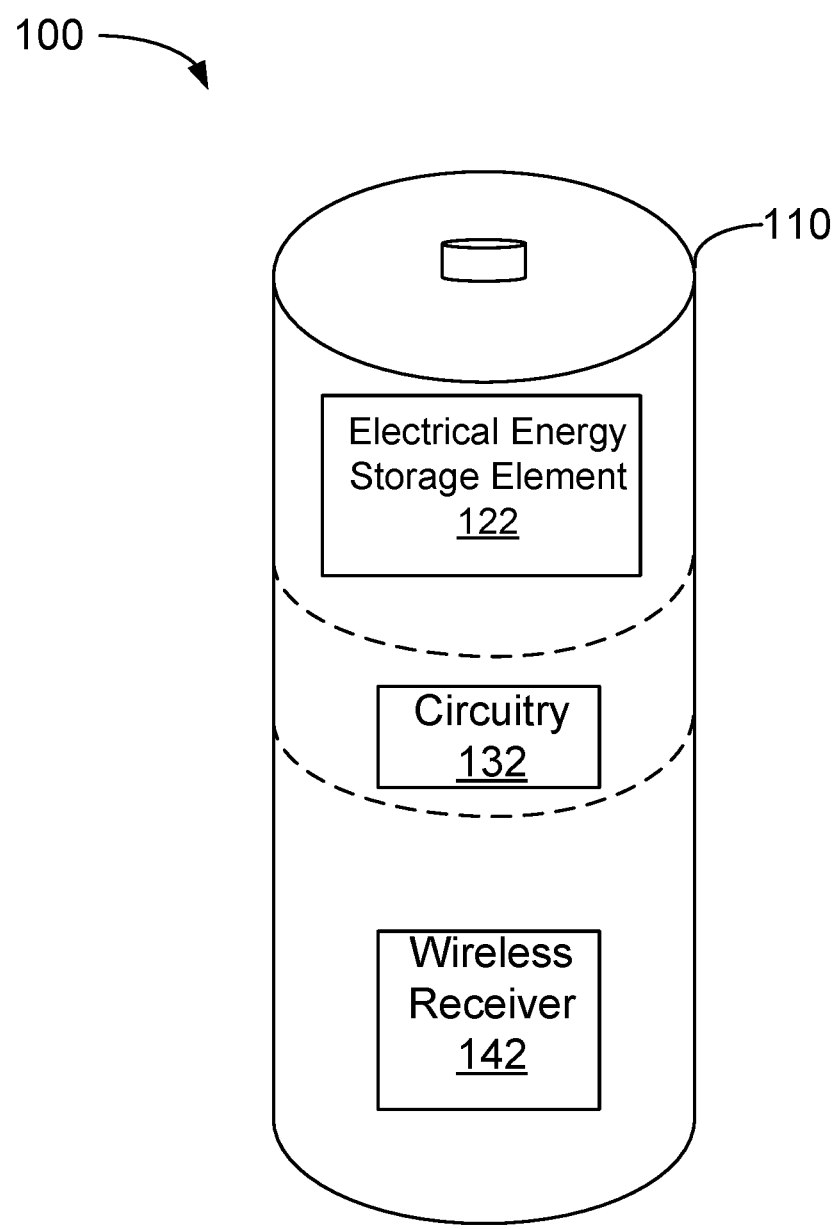
FIG. 1 is a diagram of a wireless rechargeable battery in accordance with various embodiments of the present disclosure.

Referring now to FIG. 1, the figure shows an exemplary concept of a wireless rechargeable battery, in accordance with the present disclosure. In one such embodiment, the wireless rechargeable battery 100 includes a battery casing or housing 110 that holds (1) an electrical energy storage element 122 (e.g., a capacitor, a supercapacitor, a rechargeable or secondary battery cell, etc.), (2) internal electronics or circuitry 132 for power management, control, and/or communication, and (3) a wireless receiver 142 for supplying electrical energy to the electrical energy storage element 122 and the internal electronics 132 in the presence of a magnetic field provided by a charging base station. In various embodiments, the internal electronics or circuitry 132 may be disposed in a circular disc (or other type of divider structure) that separates the electrical energy storage element 122 from the wireless receiver 142 and is configured with input contacts for coupling to the receiver 142 and output contacts or connection points for coupling to the electrical energy storage element 122.

In some embodiments, the energy storage element 122 may comprise a secondary (rechargeable) battery cell. Examples of secondary (rechargeable) battery cells may include, but are not limited to, nickel cadmium, nickel metal hydride, and lithium-ion. In other embodiments, the energy storage element 122 may comprise a capacitor or supercapacitor. It should be understood that combinations of various types of energy storage elements may also be used in order to meet certain performance parameters such as energy density, power density, self-discharge, etc.

Figure 2A:
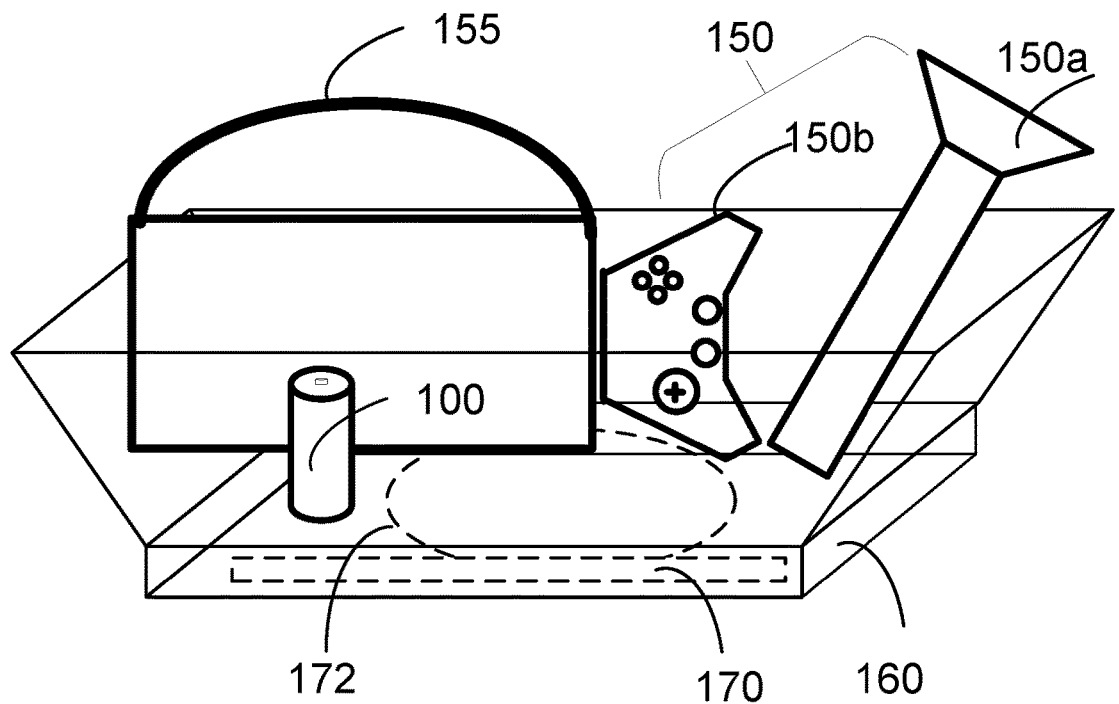
FIGS. 2A and 2B show example implementations of a wireless rechargeable battery in a user environment.
Figure 2B:
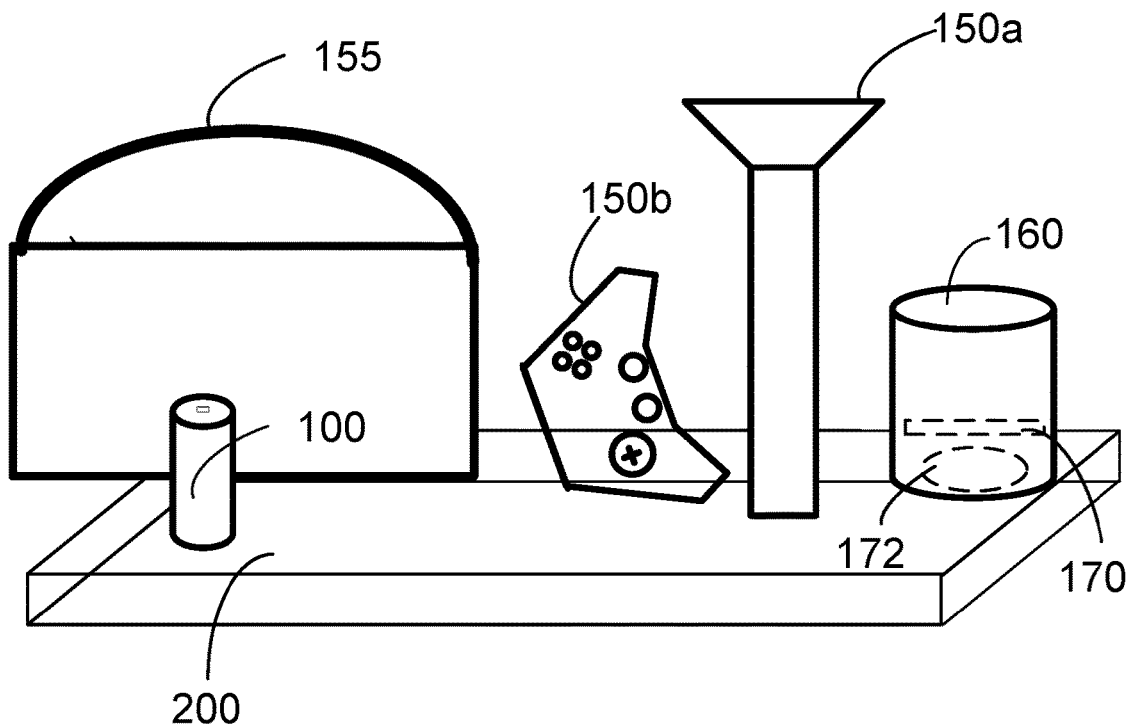

FIGS. 2A and 2B show example implementations of a wireless rechargeable battery in a user environment. As shown in FIGS. 2A-2B, a user environment may include devices containing wireless rechargeable batteries. Examples of devices containing wireless rechargeable batteries may include, but are not limited to, household devices (such as a flashlight 150a) and consumer electronics (such as a game controller 150b). Household device 150a and consumer electronics 150b may be referred to collectively herein as user devices 150. Other elements of the user environment can include a stand-alone (e.g., not located within another device) wireless rechargeable battery 100 and a carrier 155. Examples of a carrier 155 may be a purse, backpack, satchel, laptop bag, or any other vessel suitable for transporting and containing items and may contain one or more wireless rechargeable batteries 100 and user devices 150. The carrier 155 may include multiple zippers, pockets, and other storage compartments.

To charge the electrical energy storage element 122 within the wireless rechargeable battery 100, a user can simply place the wireless rechargeable battery 100, and/or user device 150 equipped with one or more of the wireless rechargeable batteries 100 and/or carrier 155 near a charging base station 160. The wireless rechargeable batteries 100, in accordance with the present disclosure, may remain inside the user device 150 and/or carrier 155, or be removed from the user device 150 before being positioned within range of the charging base station 160. In one embodiment, the charging base station 160 has a wireless transmitter 170 with a transmitter coil 172. The wireless transmitter 170 may take the form of, for example, but is not limited to, a flat charging pad (e.g., 6 inches wide/long), as represented in FIG. 2A, or a small tower (e.g., 6 inches high), as represented in FIG. 2B. Various other sizes and shapes for the charging base station 160 are also contemplated in accordance with the present disclosure. In another embodiment, the charging base station 160 may comprise a mechanically moving permanent magnet to create the magnetic field.

The charging base stations 160 may be integrated into various common household items, such as, but not limited to, toy baskets, tables/surfaces, cabinetry, desk lamps, smart speakers, or enumerable other household products, with the idea being that the charging base station and the transmitter are hidden from view. Since wireless charging rates are dependent on the proximity of the wireless rechargeable battery 100 to the charging base station 160, charging times of a few hours are possible (similar to charging rates for conventional rechargeable batteries). However, unlike conventional charging systems, the maximum charging distance between the wireless rechargeable battery 100 and the charging station 160 can be several feet in length (e.g., up to 3 feet) in various embodiments.

Further, in some embodiments, the internal electronics 132 may further include circuitry for determining, monitoring, and showing a status parameter, such as an LED indicator or a sound-generating device for presenting a current state of charge for a secondary battery cell or a charging indicator. In some embodiments, the internal electronics 132 may include electrical circuitry for communication or data transfer with the charging base station 160 for purposes such as identifying specific wireless rechargeable batteries, turning on/off the charging station, reporting state of charge, and/or reporting charging rate.

In some embodiments, the internal electronics 132 may include sensors for communication, control, or other functions. The sensors may be responsive to mechanical, acoustic, optical, chemical, or other parameters. For example, a magnetic field sensor could be used to detect for the presence of a suitable charging field. As a further example, a motion sensor (accelerometer) could be included to detect a shake or tap by the user in order to initiate (or terminate) a charge sequence. In some embodiments, the internal electronics 132 may include actuators, such as vibrating motor or a sound-generating device (e.g., buzzer, beeper, speaker) for communication, control, or other functions. For example, a user may query the state of charge by tapping the wireless rechargeable battery 100 three times, wherein the battery 100 produces a beeping response that indicates the state of charge. In another embodiment, a first wireless rechargeable battery 100 can actuate the magnet of the wireless receiver 142, producing a specific magnetic signal that can be detected by a magnetic field sensor in a neighboring wireless rechargeable battery. These examples of sensors and actuators are not to be limiting, but are examples only, as many other functions can be implemented for information exchange between the battery 100 and charging base station 160, between one wireless rechargeable battery and a second rechargeable battery, and between a wireless rechargeable battery and human user, in various embodiments.

An exemplary battery casing 110 of the wireless rechargeable battery 100 may conform with those of standard household (primary) batteries, such as AA, AAA, C, D, A23, CR123A batteries, among others. Accordingly, a form-factor of the battery casing 110 may be cylindrical, rectangular prism, button, etc., in various embodiments.

While nearly everyone is a user of standard household batteries, such as standard AA alkaline batteries, these single-use or primary batteries require periodic replacement, which incur time, cost, and waste. Therefore, many people have tried rechargeable or secondary batteries, but have experienced the charging inconvenience of having to remove these conventional secondary batteries, put the batteries on a charger, wait for several hours, and then reinstall the batteries in a user device or in commercial electronic. This cumbersome process creates a huge inconvenience and burden on the user. Accordingly, a primary reason why rechargeable household batteries have not displaced non-rechargeable household batteries is the inconvenience of the recharging process. Thus, a wireless rechargeable battery system in accordance with the present disclosure can advantageously provide a convenient and eco-friendly option for consumers, thereby satisfying a need yet to be met by any other existing technology. As such, the ability to turn an "ordinary" household device into a wireless rechargeable product provides new opportunities for product innovation. Furthermore, this capability to eliminate accessible battery compartments enables safer children's toys (e.g., less choking hazards, reduction in lost parts, etc.) and more reliable waterproof products (e.g., creating hermetically sealed devices containing wireless rechargeable batteries).

Since a portion of the volume of the wireless rechargeable battery 100 is reserved for the wireless receiver 142 and internal electronics 132, the total volume of the electrical energy storage element 122 is less than a standard rechargeable battery cell, in various embodiments. In some embodiments, NiMH battery cells are utilized as the electrical energy storage element. However, rather than using nickel-metal-hydride (NiMH) battery cells, like those used in most rechargeable household batteries, higher-energy-density lithium ion cells are utilized in some embodiments, thereby significantly increasing the energy density (resulting in more battery capacity) versus conventional NiMH batteries. With lithium ion battery cells, it is possible that the performance of the wirelessly rechargeable battery 100 will match or surpass that of a regular non-rechargeable battery.

Regardless of what cell technology is selected (NiMH vs. Li-ion), there is a tradeoff between having a larger electrical energy storage element (leading to a longer lasting battery) versus having a larger wireless receiver 142 (leading to faster charging capabilities). Accordingly, various embodiments of a wireless rechargeable battery 100 of the present disclosure will employ different designs covering these various options.

Referring back to FIGS. 2A-2B, the charging base station 160 can include a transmitter system 170. The transmitter system 170 shows an example architecture for electrodynamic wireless power transfer (EWPT) featuring an electric coil 172. Accordingly, an AC magnetic field (e.g., B(t) generated by the transmitter system 170) can operate at low frequency (e.g., 1-10,000 Hz) while maintaining a valuable wirelessly transmitted power density. The lower frequency approach can safely operate with higher magnetic field strengths, since the admissible magnetic field strength for safe exposure of human can be higher when lower frequencies are utilized. In addition, the low frequency of operation can mitigate the field attenuation and parasitic heating effects as compared with RF fields utilized in some conventional wireless power transmissions. This makes EWPT suitable for transmitting power to multiple rechargeable wireless batteries (having wireless receivers) in an environment crowded and cluttered with metallic objects such as a home, office, automobile, clothing, etc. As an example application, a collection of small electronic devices (not shown) equipped with wireless rechargeable batteries 100 of the present disclosure may be positioned on a table 200 (see FIG. 2B) within a user's home. The small electronic devices may include items such as a clock, digital picture frame, wireless computer peripherals (e.g., mouse, keyboard, etc.), fitness tracking devices, health monitoring devices, headphones, remote controls, etc. To simultaneously charge the respective batteries of each of these devices, a charging base station 160 (such as a tower charging base station) may be positioned on the table and activated without disturbing or moving each of the electronic devices.

In addition to recharging the wireless rechargeable battery 100 of the present disclosure, a conventional rechargeable battery that is in series with a wireless rechargeable battery 100 can also receive a charging current produced by the wireless receiver of the wireless rechargeable battery 100. Accordingly, with the aid of the wireless rechargeable battery 100, a conventional rechargeable battery can also be charged in accordance with the present disclosure without the need to remove the standard rechargeable battery from a user-device and physically connect the rechargeable battery to a battery charging system.

The wireless rechargeable battery system of the present disclosure can deliver power over several feet to small wireless receivers 142 (e.g., electromechanical wireless receivers) within the battery casing 100. Compared to other wireless charging systems, which operate in the MHz to GHz radio frequency range, systems of the present disclosure use much lower operational frequencies (e.g., 1-100 Hz, 10-1000 Hz, or 100-10,000 Hz). Technological advantages of this low-frequency approach include the ability for transmission through electrically conductive materials such as metal casings, conductive fluids, and biological tissues (which the RF approaches cannot do); increased safety due to the operation of electromagnetic fields at lower frequency levels than the radio frequency (RF) electromagnetic fields used in other wireless power technologies; no requirement for a specific position or orientation being met for successful charging between the charging base station 160 (transmitter 170) and the wireless rechargeable battery 100 (receiver 142); the ability to simultaneously charge multiple user-devices 150 in a cluttered environment; and the ability to fit a miniaturized wireless power receiver within small user-devices 150; etc.

Figure 3:
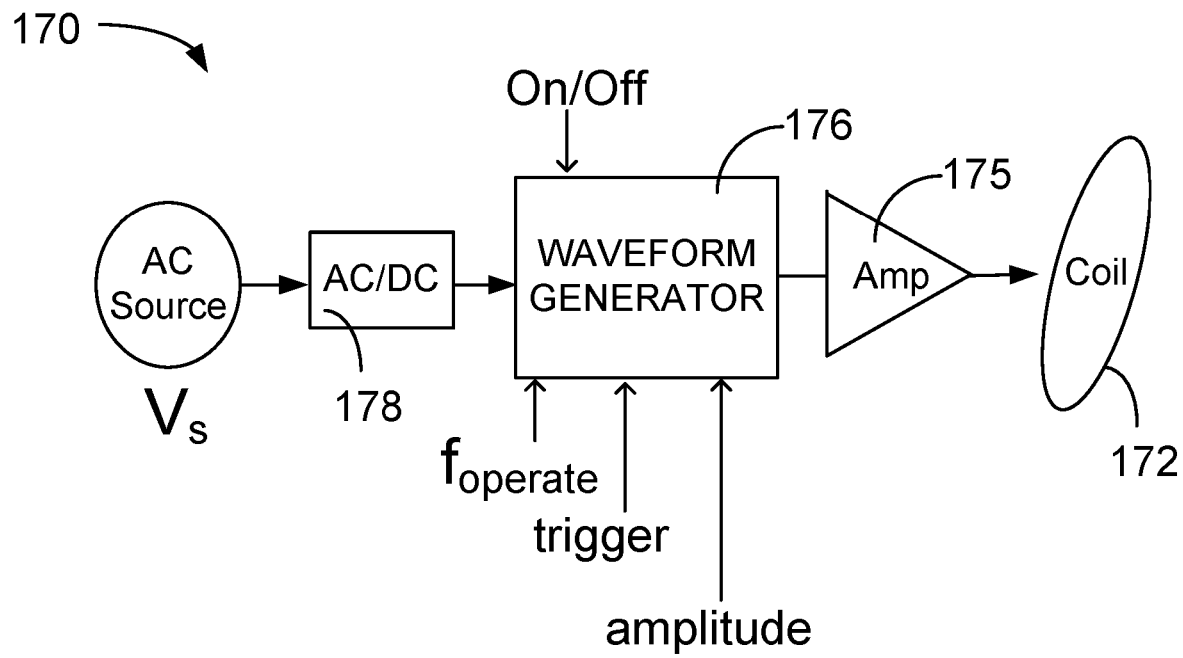
FIG. 3 is a diagram of an exemplary equivalent electrical circuit for a transmitter of the wireless rechargeable battery system in accordance with various embodiments of the present disclosure.
Figure 4:
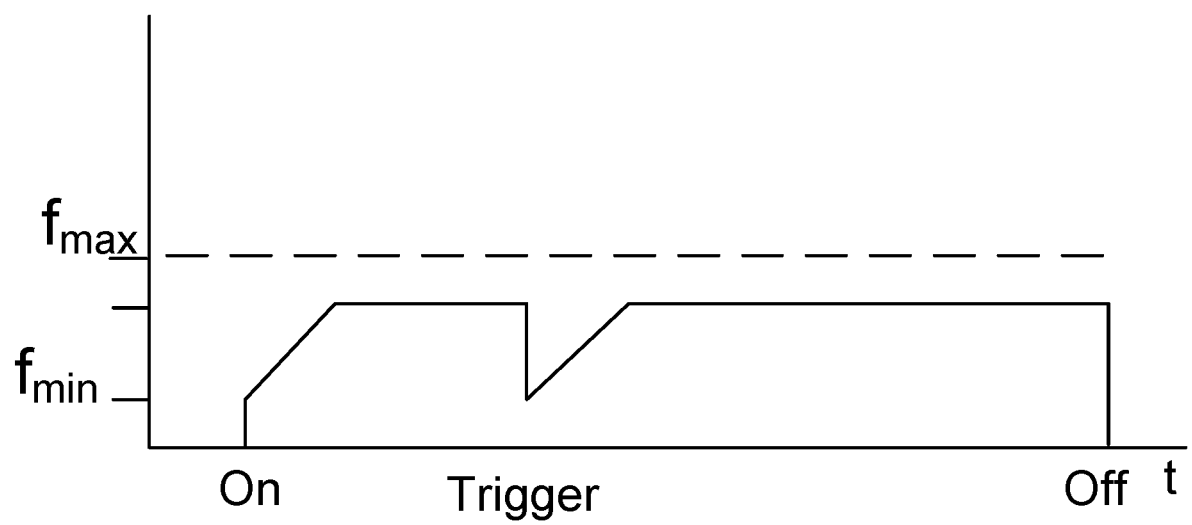
FIG. 4 is a diagram showing an exemplary AC frequency pattern utilized by an embodiment of the transmitter of FIG. 3.

Next, FIG. 3 illustrates an example equivalent electrical circuit for the transmitter 170 in accordance with embodiments of the present disclosure. To wirelessly transmit power from the transmitter 170 of the charging base station 160 to the wireless receiver 142 of the rechargeable battery 100, an AC current is supplied from a power source Vs (e.g., a wall electrical outlet) to a waveform generator 176 via an AC/DC circuit 178 of the transmitter 170. The waveform generator 176 outputs a resulting AC voltage signal at a defined operating frequency (e.g., 1-10,000 Hz) and amplitude. Accordingly, the waveform generator 176 can be configured to produce a time-varying signal in accordance with certain criteria, such as voltage amplitude and operating frequency along with having various controls such as triggers and manual on/off activations, as represented by the exemplary frequency pattern shown in FIG. 4. When the resulting AC signal is applied to a transmitter coil 172 (optionally via an amplifier circuit 175), a time-varying magnetic field having a magnetic flux density B(t) is generated and transmitted.

Figure 5:
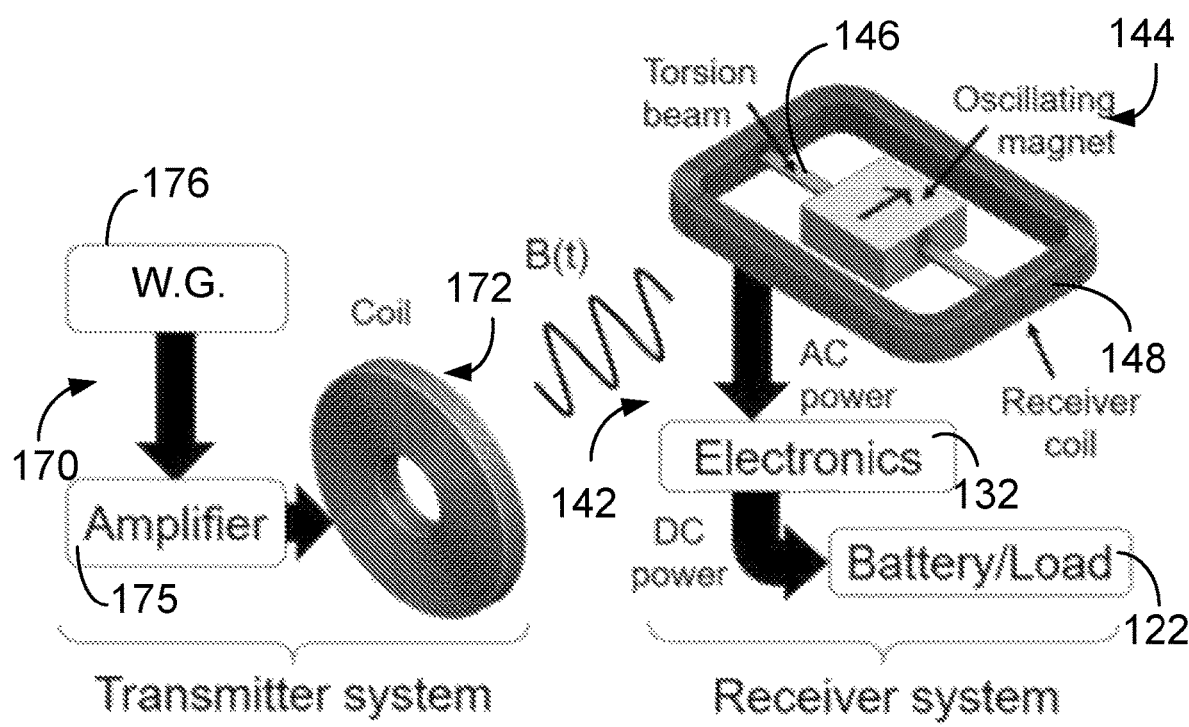
FIG. 5 is a diagram of the wireless rechargeable battery system in accordance with various embodiments of the present disclosure.

Accordingly, with a wireless rechargeable battery 100 being in proximity of the charging base station 160 and transmitter 170, the transmitted magnetic field couples with a receiver magnet 144 of the receiver 142, as represented in the transmission system of FIG. 5. Therefore, at the wireless receiver 142 of the wireless rechargeable battery 100, this coupling leads to oscillating movement of one or more permanent magnets 144 supported by a suspension 146 that is sensitive to the time-varying magnetic field from the transmitter 170. The magnet oscillation can additionally or alternatively include a rotational or a vertical or horizontal translation. While oscillating, the magnet 144 can change & shape the magnetic flux in a receiver coil 148 and can generate an AC voltage by induction. With the receiver coil 148 being connected to internal power electronics 132, a regulated DC voltage is generated to charge electrical energy storage element 122 within a storage area of the battery casing 110 for the wireless rechargeable battery 100. In other embodiments, the one or more permanent magnets in the wireless receiver may continuously rotate in response to the magnetic field.

In certain embodiments, additional soft ferromagnetic materials may be included in the wireless rechargeable battery 100 to enhance the wireless power transfer (e.g., power, distance, or efficiency). Examples of soft ferromagnetic materials may include, but are not limited to, nickel, cobalt, iron, nickel iron, iron cobalt, steel, spring steel, ferrites or other suitable materials. It is possible that the battery casing 110, energy storage element 122, and/or internal electronics 132 may possess such soft ferromagnetic materials that may affect the operation of the receiver 142. In some embodiments, the structures containing soft ferromagnetic components are designed and arranged so as to advantageously shape, concentrate, and/or magnify the magnetic field provided from the charging base station 160, so as to enhance the wireless power transfer. Therefore, in certain embodiments, the battery casing 110, energy storage element 122, and/or internal electronics 132 components of FIGS. 1 and 5 may include ferromagnetic materials.

Figure 6:
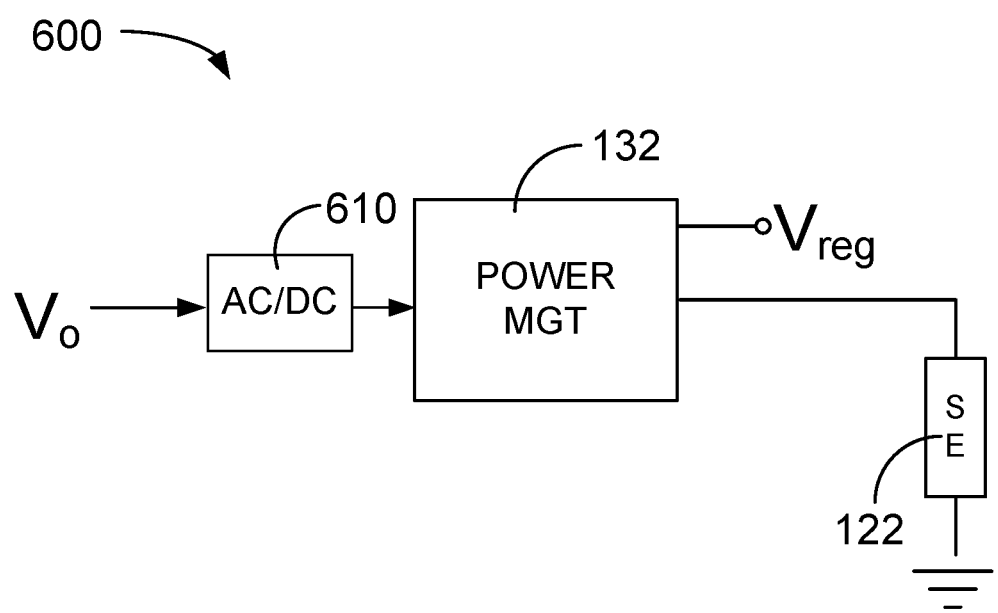
FIG. 6 is a diagram of an exemplary equivalent electrical circuit for a receiver of the wireless rechargeable battery system in accordance with various embodiments of the present disclosure.

Referring now to FIG. 6, an example equivalent electrical circuit 600 for the wireless receiver 142 is illustrated in accordance with embodiments of the present disclosure. Via the electrical circuit 600, the AC voltage $V_o$ generated by induction at the receiver coil 148 is converted to a DC voltage (via AC/DC circuitry 610 (e.g., a diode bridge rectifier)) and supplied to internal power management electronics or circuitry 132 (e.g., Texas Instruments BQ25570 Ultra Low Power Harvester Power Management IC with Boost Charger, and Nanopower Buck Converter) to obtain a regulated DC voltage (e.g., a constant 5V DC signal). The regulated DC voltage is then applied to an electrical energy storage element (SE) 122 of the wireless rechargeable battery 100 as a charging current.

Figure 7:
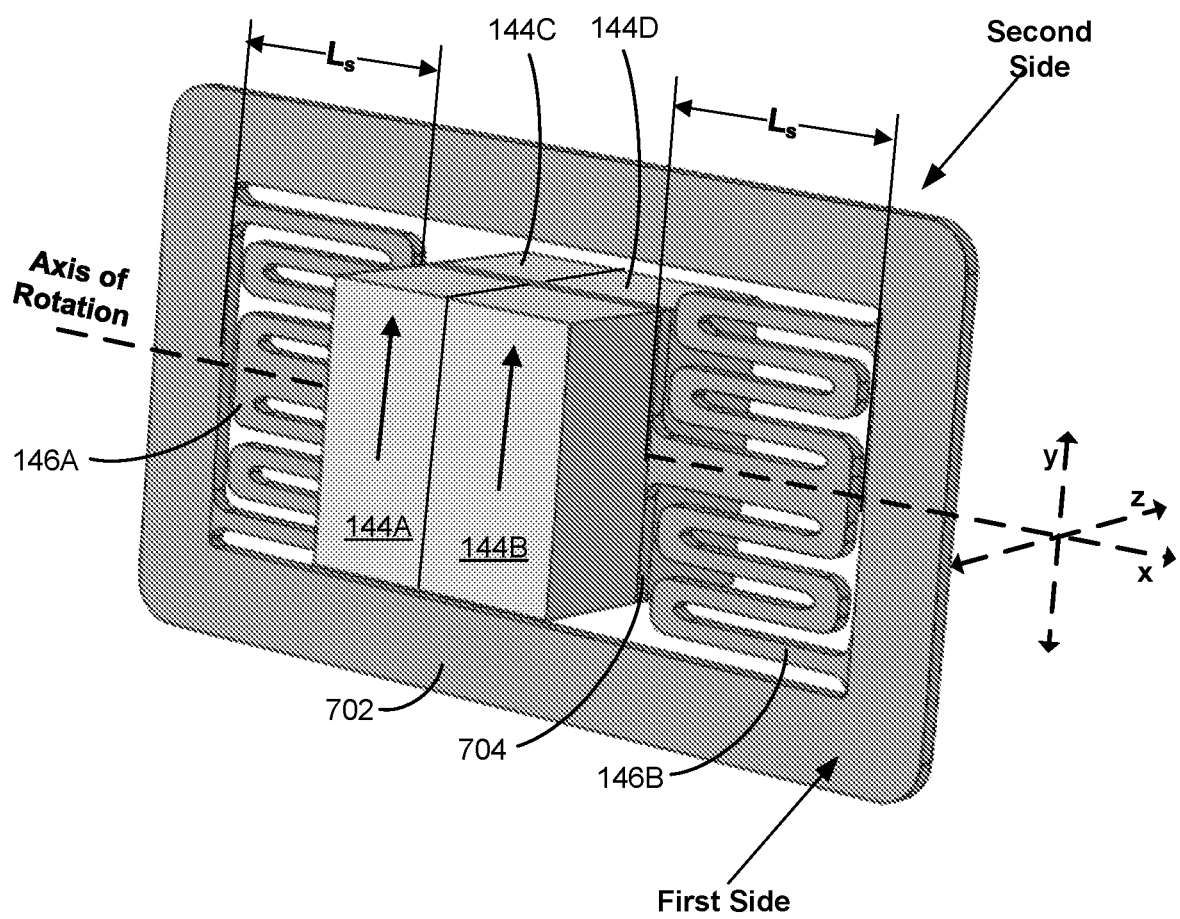
FIG. 7 is a diagram of a suspension structure of the receiver of FIG. 6 in accordance with various embodiments of the present disclosure.

As discussed, the receiver 148 includes a microfabricated structure or suspension structure 146 and one or more permanent magnets 144 supported by this structure 146. As shown in FIG. 7, the microfabricated structure 146 can include a planar or otherwise microfabricated structure of a particular material such as, but not limited to, silicon or another material as discussed. An additive or subtractive process can result in a planar structure that can include a single or continuous piece of a particular material. In some cases, the planar structure can include multiple separately constructed elements, or elements constructed through different process steps and attached together. The microfabricated suspension structure can include a frame 702, a suspension 146 including suspensions 146A and 146B, and a magnet platform 704. The suspensions 146A and 146B can connect the frame 702 to the magnet platform 704. The suspensions 146A and 146B can each have a suspension length $L_s$. The suspension length $L_s$ can be optimized depending on the particular shape or design of the suspension.

As discussed, in some embodiments, the suspensions can include microfabricated substrates including silicon, semiconductors, metals, polymers, and other materials for suspensions within a battery case or enclosure. Silicon suspensions, as compared to other materials, have the potential to increase the resonant amplitude of the wireless receiver, making it more responsive to lower magnetic fields, and therefore extending the power transmission distance. Silicon suspensions can have lower mechanical damping as compared to other materials. In an exemplary embodiment, magnets 144A and 144B are attached to a first side of the magnet platform 704. Magnets 144A and 144B can alternatively be a single magnet. Each of the magnets can be magnetized in the direction shown by the arrows, i.e., orthogonal to the frame 702, so that the magnetization is orthogonal to a coil around the magnets, where the coil is along the frame 702 and a conductor of the coil is wound substantially parallel to the suspension and the frame 702. The direction of magnetization can also be orthogonal to an axis of rotation of the suspension.

Magnets 144C and 144D can be attached to a second side of the magnet platform 704 opposite the first side and the magnets 144A and 144B and can also be magnetized in the direction shown. Magnets 144C and 144D can alternatively be a single magnet. Moreover, there can be any number of magnets attached to each side of the magnet platform 704 from one magnet on each side to many magnets on each side of the magnet platform 704. The magnets 144 can be any type of magnet, including neodymium, neodymium iron boron (NdFeB), samarium cobalt (SmCo), alnico, ceramic, or ferrite magnets.

Two receiver coils 148 (not shown) can be attached to the frame 702. For example, a first receiver coil can be attached to a first side of the frame 702 and can encircle or surround magnets 144A and 144B in a spiral or helical shape that traces the shape of the frame 702 and builds in the z direction. A second receiver coil can be attached to a second side of the frame 702 and can encircle or surround magnets 144C and 144D in a spiral or helical shape that traces the shape of the frame 702 and builds in the z direction. Each coil 148 can be made of metal winding, magnet wire, or enameled wire, such as copper, aluminum or other suitable material, and can include thin insulation such as polymer film insulation.

In some embodiments, suspensions 146A and 146B can set the resonant frequency of the resonator through their rotational stiffness and allowing a rotation of the magnet (e.g., ±20°). The length of the suspension $L_s$ can be optimized to be as small as possible to minimize the receiver volume (e.g., increase power density) and to minimize the wiring far from the magnets where the fields are weaker (e.g., lower coil resistance leads to higher power). The resonant frequency can be tuned or designed through physical characteristics of the structure and the suspension including its shape and material characteristics. The resonant frequency can be tuned for optimal power coupling with a time-varying magnetic field of a transmitter coil. In some cases, the resonant frequency of the structure can be tuned to match a frequency of the time-varying magnetic field of a transmitter coil. For example, the resonant frequency of the structure and the frequency of the time-varying field can be designed to be within a threshold difference from each other, such as within 5%, 10%, 15%, 20% or 25%. In other examples, the resonant frequency of the structure can be designed to be within a threshold difference, such as within 5%, 10%, 15%, 20%, or 25% from a multiple of, or a fraction of, the frequency of the time-varying field.

Additional details on various embodiments of a wireless receiver and transmitter that are compatible for use with the wireless rechargeable battery system of the present disclosure are described in the following publications which are incorporated herein in their entireties: (1). A. Garraud, D. J. Munzer, M. Althar, N. Garraud, and D. P. Arnold, "Watt-level wireless power transmission to multiple compact receivers," *J. Physics: Conf. Series*, vol. 660, 012039, 5 pages, December 2015; and (2) N. Garraud, D. Alabi, J. D. Varela, D. P. Arnold, and A. Garraud, "Microfabricated electrodynamic wireless power receiver for bio-implants and wearables," *Tech. Dig. Solid-State Sensors, Actuators, and Microsystems Workshop*, Hilton Head, SC, June 2018.

It should be emphasized that the above-described embodiments of the present disclosure are merely possible examples of implementations, merely set forth for a clear understanding of the principles of the disclosure. Many variations and modifications may be made to the above-described embodiment(s) without departing substantially from the principles of the disclosure. All such modifications and variations are intended to be included herein within the scope of this disclosure and protected by the following claims.

The invention claimed is:

1. A wireless rechargeable battery system comprising:
    an electrical energy storage element for a wireless rechargeable battery;
    a wireless receiver for the wireless rechargeable battery, wherein the wireless receiver is configured to supply electrical energy to the electrical energy storage element in a presence of a magnetic field from a charging base station;
    an internal electronics circuitry for the wireless rechargeable battery, wherein the internal electronics circuitry couples the electrical energy storage element and the wireless receiver; and
    a battery casing that holds the electrical energy storage element, the wireless receiver, and the internal electronics circuitry,
    wherein the wireless receiver comprises a plurality of magnets supported by a suspension structure on opposing sides of the plurality of magnets within the battery casing and a plurality of receiver coils, wherein the magnetic field induces the plurality of magnets to oscillate and generate an AC voltage in the receiver coils, wherein the internal electronics circuitry converts the AC voltage to a DC charging signal that is applied to the electrical energy storage element.

2. The wireless rechargeable battery system of claim 1, wherein the internal electronics circuitry determines a status parameter for the wireless rechargeable battery indicating a current state of charge for the wireless rechargeable battery.

3. The wireless rechargeable battery system of claim 2, wherein the internal electronics circuitry comprises an LED indicator for showing a current state of charge for the wireless rechargeable battery.

4. The wireless rechargeable battery system of claim 1, wherein the wireless receiver supplies the electrical energy via electromechanical transduction.

5. The wireless rechargeable battery system of claim 1, further comprising the charging base station, wherein the charging base station comprises at least one coil.

6. The wireless rechargeable battery system of claim 1, further comprising the charging base station, wherein the charging base station comprises a mechanically moving magnet.

7. The wireless rechargeable battery system of claim 1, wherein the wireless receiver shapes the magnetic field from the charging base station.

8. The wireless rechargeable battery system of claim 1, further comprising the charging base station, wherein the charging base station comprises a flat charging pad.

9. The wireless rechargeable battery system of claim 1, further comprising the charging base station, wherein the charging base station comprises a tower charging station.

10. The wireless rechargeable battery system of claim 1, further comprising the charging base station, wherein the charging base station is integrated into a household product.

11. The wireless rechargeable battery system of claim 1, wherein a maximum charging distance between the wireless receiver and the charging base station is 3 feet.

12. The wireless rechargeable battery system of claim 1, further comprising the charging base station, wherein the charging base station comprises a transmitter for generating a time-varying magnetic field at a frequency, wherein the frequency is within a range of 1-100 Hz, 10-1000 Hz, or 100-10,000 Hz.

13. The wireless rechargeable battery system of claim 1, wherein the wireless rechargeable battery comprises a cylindrical form-factor.

14. The wireless rechargeable battery system of claim 13, wherein the wireless rechargeable battery comprises a cylindrical form-factor for an AA or an AAA battery.

15. The wireless rechargeable battery system of claim 1, wherein the wireless rechargeable battery comprises a rectangular prism form-factor.

16. The wireless rechargeable battery system of claim 1, wherein the electrical energy storage element comprises a lithium ion battery cell, a nickel metal hydride battery cell, or a supercapacitor.

17. The wireless rechargeable battery system of claim 1, wherein the internal electronics circuitry comprises a sensor that is configured to detect a mechanical, acoustic, optical, or chemical condition and in response affect charging operation of the wireless rechargeable battery system.

18. The wireless rechargeable battery system of claim 1, wherein the internal electronics circuitry is configured to actuate a magnet of the wireless receiver thereby producing a magnetic signal for communicating with the charging base station and/or a nearby wireless receiver of a nearby rechargeable battery system.

19. The wireless rechargeable battery system of claim 1, wherein structures of the battery casing, the electrical energy storage element, and/or the internal electronics circuitry possess ferromagnetic materials.

20. The wireless rechargeable battery system of claim 1, wherein the suspension structure sets a resonant frequency of the wireless receiver.

21. The wireless rechargeable battery system of claim 20, wherein the suspension structure comprises a silicon material.

* * * * *